United States Patent [19]

Yamamoto et al.

[11] 4,027,978

[45] June 7, 1977

[54] METHOD AND APPARATUS FOR NON-CONTACT MEASUREMENT OF A GAUGE OF A HIGH TEMPERATURE MATERIAL

[75] Inventors: Tomio Yamamoto, Takamatsu; Koji Sakasegawa, Fukuyama; Atsushi Osumi, Fukuyama; Yukio Hosaka, Fukuyama; Takeo Yamada, Yokohama, all of Japan

[73] Assignees: Nippon Kokan Kabushiki Kaisha, Tokyo; Fuji Toyuki Kabushiki Kaisha, Takamatsu, both of Japan

[22] Filed: Jan. 8, 1974

[21] Appl. No.: 431,735

[30] Foreign Application Priority Data

Aug. 27, 1973  Japan .............................. 48-96019
Jan. 10, 1973  Japan .............................. 48-5140

[52] U.S. Cl. .............................. 356/156; 356/167; 356/159
[51] Int. Cl.² .............................. G01B 11/04
[58] Field of Search .............. 356/156, 9, 159, 167

[56] References Cited

UNITED STATES PATENTS

| 3,016,464 | 1/1962 | Bailey | 356/156 |
| 3,187,185 | 6/1965 | Milnes | 356/156 |
| 3,612,890 | 10/1971 | Cornyn et al. | 356/167 |
| 3,773,422 | 11/1973 | Stavis et al. | 356/156 |

Primary Examiner—John K. Corbin
Assistant Examiner—R. A. Rosenberger

[57] ABSTRACT

There are provided a method and apparatus for non-contact measurement of a gauge of a high temperature material such as a red-hot steel slab, wherein the entire optical system including a light source, a filter and a detector is employed at wavelengths in the near-ultraviolet zone, preferably in the range 4,300 – 4,400 A, and a sampling mark corresponding to a reference projection point for an optical mark of wavelengths in the near-ultraviolet zone is established on the screen of a television receiver on which the optical mark is displayed in accordance with the output of a camera tube which receives the optical mark through a band-pass filter which transmits the wavelengths in the near-ultraviolet zone, whereby the light source and the camera tube are translated from the reference positions until the optical mark formed on a high temperature material to be measured coincides with the sampling mark so that the gauge of the high temperature material is measured in accordance with the distance covered by the parallel motion of the light source and the camera tube.

14 Claims, 8 Drawing Figures

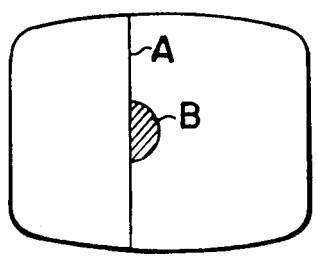
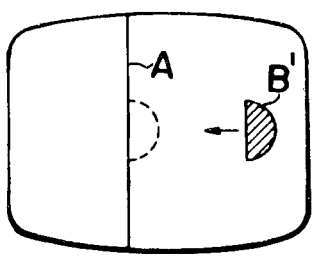
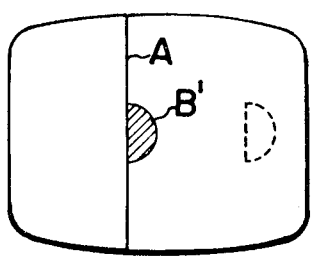
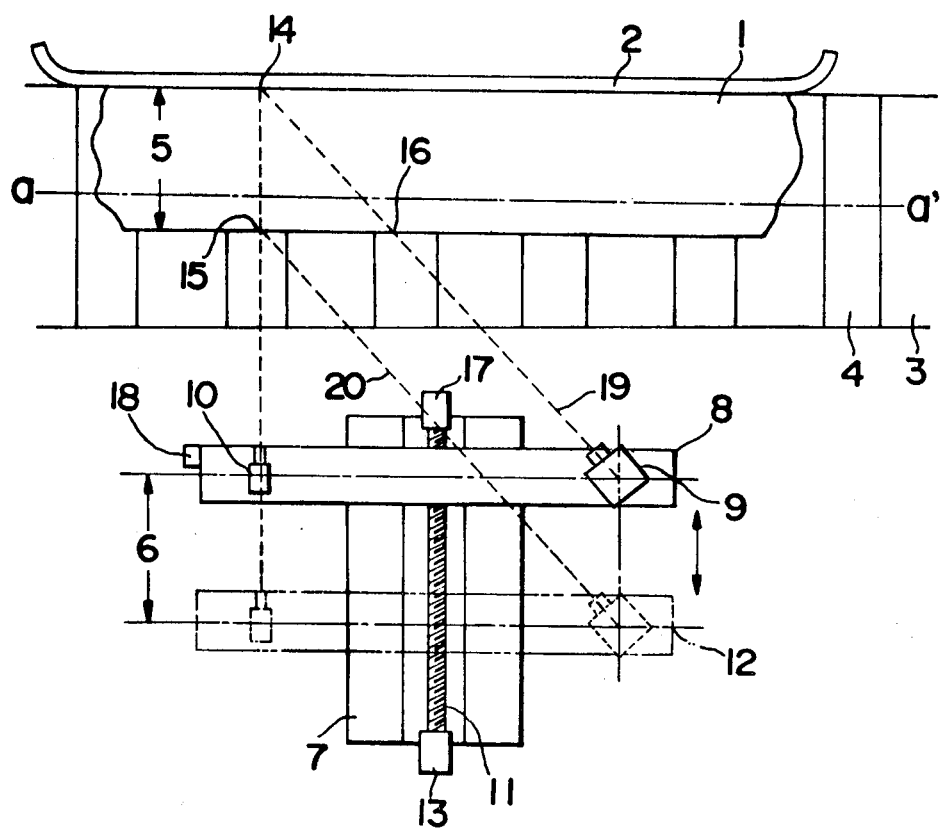

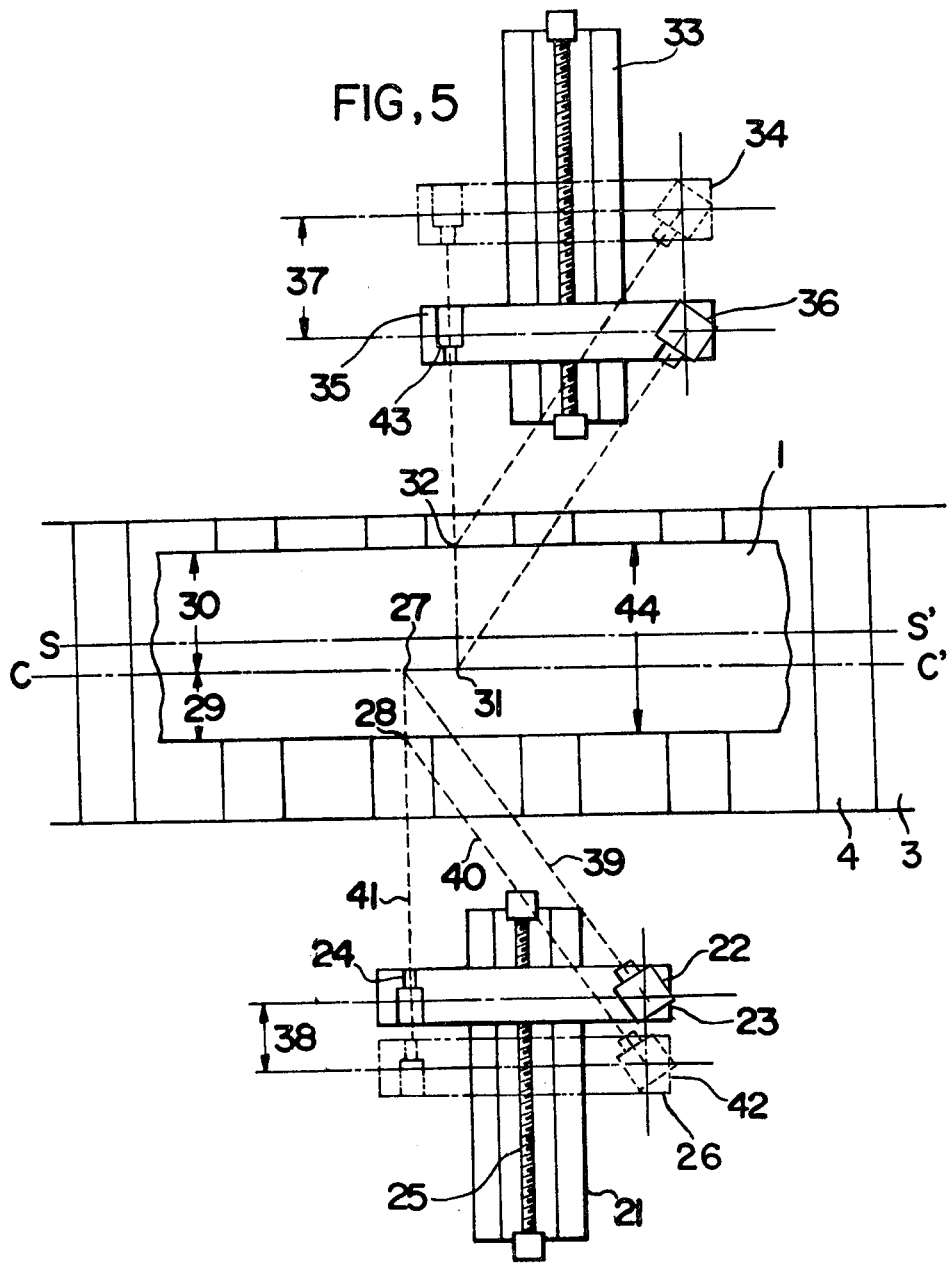

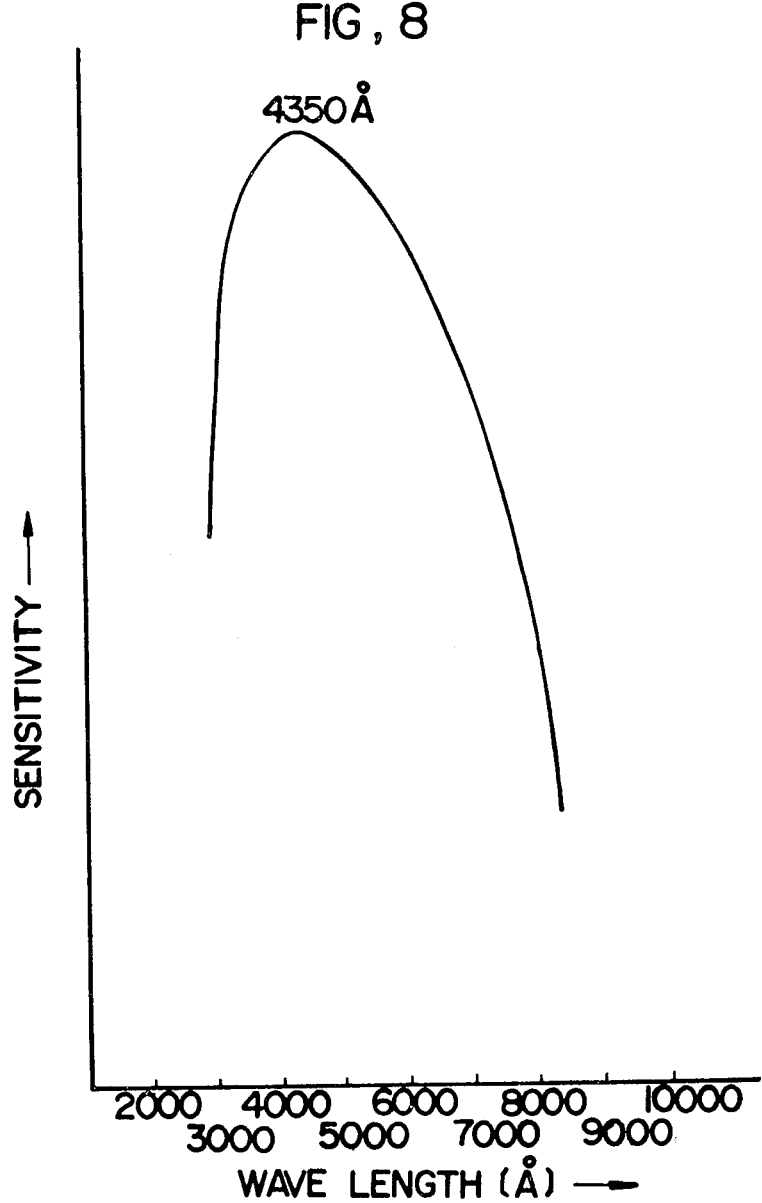

METHOD AND APPARATUS FOR NON-CONTACT MEASUREMENT OF A GAUGE OF A HIGH TEMPERATURE MATERIAL

BACKGROUND OF THE INVENTION

In the non-contact measurement of the gauge of a high temperature material such as a red-hot steel slab, the high temperature material emits a thermal radiation of a wavelength corresponding to its temperature and therefore optical gauge measuring methods employing the ordinary visible light cannot be applied to the measurement of a gauge of such a high temperature material. In other words, the thermal radiation of a high temperature material (solid) initially lies in the infrared range and then, as the temperature rises, it produces a reddish light in the temperature range between 500° - 600° C. When the temperature rises further up to about 1,100° C, the color of the light changes to yellow, and a white light is produced in the temperature range between 1,300° - 1,500° C. In this case, the thermal radiation from the material takes the form of a continuous spectrum corresponding to the respective temperatures of the material, and particularly at temperatures higher than about 700° C the wavelength band enters into the visible region of the spectrum. Consequently, if, for example, a high temperature material such as a red-hot steel slab heated to a temperature higher than 1,000° C in preparation for the hot rolling thereof is to be subjected to a gauge measuring process employing the ordinary light in the visible region, the temperature of the high temperature material to be measured is high enough to produce a thermal radiation that lies in the visible region as mentioned earlier. Therefore, a reference optical mark projected on the high temperature material will be hidden by the thermal radiation with the result that there is a tendency to cause an error in the measurement and moreover the effectuation of a measuring process itself may be made impossible.

Further, while a filter may be used in an attempt to prevent the transmission of the thermal radiation from a high temperature material, no satisfactory results are obtainable since the filter also acts simultaneously on the wavelengths of the optical mark itself.

In other words, it has been the practice in the art to distinguish an optical mark with the human eye or with such detecting means as a visible region vidicon and thus the wavelengths of the light used are confined to the visible region of the spectrum including the wavelengths between 4,000 to 7,000 A. Because of this fact, no matter in what manner a light source, a filter and a detector are combined, it has been impossible to completely eliminate the effect of the thermal radiation from a high temperature material and consequently it has been impossible to effect the required detection with good signal-to-noise ratio. For example, there are many different methods and apparatus for measuring the gauge of a high temperature material wherein, for example, a superhigh pressure mercury vapor lamp is used as a light source and an optical mark is detected with the human eye or a visible region vidicon through a band-pass filter having the maximum transmission sensitivity at 5,470 A or a light source comprising a superhigh pressure mercury vapor lamp is used and the detection of an optical mark is effected with the human eye or a visible region vidicon through a band-pass filter having the maximum transmission sensitivity at 6,480 A. However, such methods and apparatus are invariably affected seriously by the thermal radiation from a high temperature material and thus their accuracy of optical mark detection is invariably unsatisfactory.

Accordingly, in the measurement of the gauge of such a high temperature material, it is essential to use means for distinguishing the thermal radiation of the high temperature material lying in the visible region from an optical mark itself, and means for accurately converting, for example, the amount of change of position of the optical mark (i.e., the signal) in the thermal radiation (i.e., the noise) into a physical quantity, e.g., a mechanical displacement or an electrical quantity.

SUMMARY OF THE INVENTION

With a view to overcoming the foregoing difficulty, it is an object of the present invention to provide a method and apparatus in which the entire optical system including a light source, a filter and a detector is employed in the near-ultraviolet zone, preferably in the wavelength band extending from 4,300 to 4,400 A whereby to eliminate the effect of the thermal radiations essentially in the visible region of the spectrum, and a sampling mark corresponding to a reference projection point for an optical mark of wavelengths in the near-ultraviolet zone is established on the screen of a television receiver on which an optical mark is displayed in accordance with the output of a camera tube which receives the optical mark through a band-pass filter that transmits the wavelengths in the near-ultraviolet zone, whereby the light source and the camera tube are translated from the reference positions without changing the relative positional relation therebetween until the optical mark formed on the high temperature material to be measured coincides with the sampling mark to measure the gauge of the high temperature material in terms of a mechanical displacement or an electric quantity in accordance with the distance of the translation of the light source and the camera tube and thereby to ensure the elimination of the effect of the thermal radiation and the accurate conversion of the measured value into a physical quantity.

It is another object of the present invention to provide a method and apparatus for non-contacting measuring of the gauge of a high temperature material in which an optical mark projected on a high temperature material as a reference point or line for a non-contact gauge measuring process, is detected with an improved signal-to-noise ratio in the presence of the thermal radiation from the high temperature material lying in the visible region of the spectrum, and the distance covered by the parallel motion is accurately converted into a physical quantity as the quantity measured.

It is still another object of the present invention to provide a method and apparatus of the above type wherein the entire optical system including a light source, a filter and a detector is employed in the wavelength band which is different from that of the thermal radiation from a high temperature material, whereby the gauge of the high temperature material is accurately measured in a non-contacting manner and in the high temperature atmosphere.

It is still another object of the present invention to provide a method and apparatus of the above type wherein a high temperature material such as a red-hot steel slab is measured on a transfer line and its gauge is accurately converted into and measured in terms of the distance of the parallel motion of the optical system.

BRIEF DESCRIPTION OF THE DRAWING

FIG. 1 is a schematic diagram showing the manner in which an optical mark at a reference projection point is displayed on the screen of a television monitor.

FIG. 2 is a schematic diagram similar to FIG. 1, showing the manner in which the optical mark on a high temperature material is displayed on the monitor screen at a position corresponding to the gauge of the material to be measured.

FIG. 3 is a schematic diagram similar to FIG. 1, showing the manner in which the optical mark is caused to coincide with a sampling mark corresponding to the reference projection point by translating a light source and a camera tube without changing the relative positional relationship therebetween.

FIG. 4 is a plan view showing the construction of an apparatus according to an embodiment of this invention whereby a gauge of a high temperature material is measured in accordance with the optical mark on the screen of a television monitor.

FIG. 5 is a plan view showing the construction of the apparatus according to another embodiment of this invention.

FIG. 8 is a light receiving sensitivity characteristic diagram of the camera tube used in the apparatus of this invention.

DESCRIPTION OF THE PREFERRED EMBODIMENTS

Figure 6:
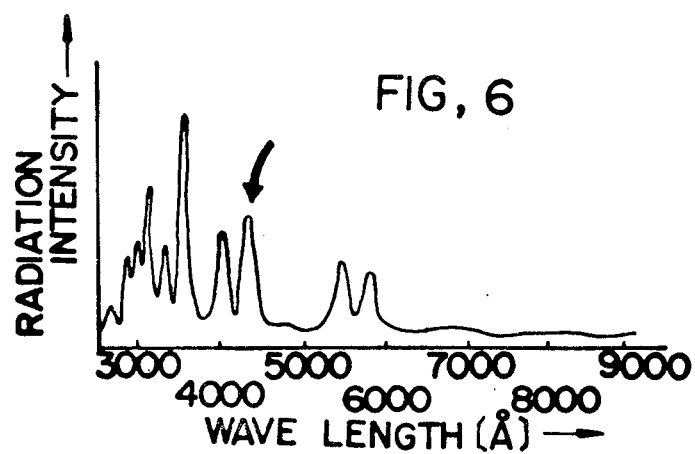
FIG. 6 is a spectral distribution diagram of a superhigh pressure mercury vapor lamp used as the light source in the apparatus of this invention.

The present invention will now be described in greater detail with reference to the illustrated embodiments of the apparatus of this invention for performing the novel method of the invention for non-contact measurement of the gauge of a high temperature material which comprises the steps of projecting a beam of light in the near-ultraviolet zone, preferably in the wavelength band from 4,300 to 4,400 A to at least one reference projection point, arranging at least one camera tube having a sensitivity in said wavelength band to face said reference projection point in a direction parallel to the direction of the gauge of the high temperature material is to be measured, arranging at least one band-pass filter having a transmission band of said wavelength band in the front of the camera tube, establishing a sampling mark corresponding to the optical mark at the reference projection point on the screen of at least one television monitor on which the output of the camera tube is displayed, and translating the light source and the camera tube in the direction of the gauge without changing the relative positional relationship initially established therebetween for projecting the light beam onto the reference projection point and in such a manner that the image on the monitor screen of an optical mark which has been formed on the high temperature material by the beam of light from the light source in the said reference projection conditions, coincides with the sampling mark on the monitor screen, thereby mechanically or electrically indicating and recording the distance of the said parallel motion to represent the gauge of the high temperature material to be measured, e.g., the width, thickness or other dimension thereof.

In FIG. 4, there is illustrated an embodiment of an apparatus according to the present invention for measuring a gauge of a high temperature material using an optical system employed at the wavelengths in the near-ultra-violet zone. The apparatus of FIG. 4 is used to measure a gauge of a red-hot steel slab 1 which is on the way from a heating furnace to a hot rolling mill by conveyor rolls 4 of a conveyor 3. A guide wall 2 is arranged along one side of the conveyor 3 at a measuring position, and the slab 1 conveyed to the measuring position by the conveyor rollers 4 is pressed against the guide wall 2 to stay standstill thereat. In this case, many different type of means are available for pressing and stopping the slab 1 against the guide wall 2. For example, it may be a hydraulic cylinder mechanism for pressing the slab 1 against the guide wall 2 or a removable guide plate located diagonally across the conveyor 3 to hold the slab 1 in place. With the guide wall 2 provided on one side, the conveyor 3 is provided on the other side thereof with a measuring instrument stand 7 which is fixedly mounted at a predetermined distance from the conveyor 3 and on which is mounted a movable rest 8. The movable rest 8 carries a light projector 9 provided with a light source consisting of a superhigh pressure mercury vapor lamp and a television camera 10 equipped with a camera tube such as a vidicon having maximum sensitivity about 4,350 A, which are arranged on the upper surface of the movable rest 8 with a preset spacing therebetween. Disposed at the front of the camera tube of the television camera 10 is a band-pass filter (not shown) comprising a metal interference filter having the maximum transmission sensitivity at about 4,358 A, and in this way the effect of the thermal radiation from the slab 1 which is a high temperature material is eliminated.

The movable rest 8 is threadedly mounted on a feed screw 11 disposed on the measuring instrument stand 7, and the feed screw 11 is driven by a motor 17 mounted on the stand 7 so that the movable rest 8 is translated along the stand 7 in accordance with the turning of the feed screw 11 driven by the motor 17. Of course, the means for moving the movable rest 8 is not limited to the feed screw and any other means such as a gear drive may also be employed. In this embodiment, the apparatus of this invention is used to measure the width of the slab 1 and therefore the instrument stand 7 is arranged normal to the center line a-a' of the conveyor 3 so that the direction of the axis of the feed screw 11 runs parallel to the direction of the width of the slab 1. On the other hand, the movable rest 8 is arranged normal to the direction of the axis of the feed screw 11.

In the arrangement of FIG. 4, prior to the delivery of the slab 1 in front of the measuring instrument stand 7, the television camera 10 is directed in a direction parallel to the direction of the dimension to be measured (i.e., the direction of the width in the case of this embodiment), and an image pickup point 14 is fixed on the side of the guide wall 2 as a reference projection point. Consequently, when the beam of light in the previously mentioned wavelength band is projected from the projector 9 to the image pickup point 14, the optical mark thus projected on the guide wall 2 is displayed on the monitor screen of the television camera 10. This image receiving condition is regarded as a reference condition and a reference point or line corresponding to the optical mark displayed on the monitor screen is established as a sampling mark. FIG. 1 illustrates the television monitor screen showing this condition in which symbol A designates the sampling mark and symbol B designates the optical mark at the reference projection point.

In this condition, when the slab 1 comes in front of the measuring instrument stand 7, the motor 17 starts operating in response to the detected signal from a detector 18, e.g., a photocell mounted on a portion of the apparatus and thus the movable rest 8 is translated to move away from the conveyor 3 by the feed screw 11. in other words, when the slab 1 arrives in front of the stand 7, a projection line 19 of the projector 9 strikes the slab 1 slantwise and thus the optical mark at a projection point 16 on the surface of the slab 1 is displayed on the screen of the television monitor as shown in FIG. 2 in which the optical mark B is located to the right of the sampling mark A. However, when the parallel motion of the movable rest 8 brings it to a position 12 indicated by the dotted line in FIG. 4, the projection line from the projector 9 now changes as designated by numeral 20 in FIG. 4. As a result, the optical mark on the slab 1 is moved to an image pickup point 15 which is in alignment with the reference projection point 14 and thus the sampling mark A coincides with the optical mark B on the television monitor screen as shown in FIG. 3. In this case, if the coincidence between the sampling mark and the optical mark on the television monitor screen is detected, for example by a vidicon so that the motor 17 is cut out of operation upon the detection of the coincidence, the distance 6 covered by the movable rest 8 during this time interval corresponds to the width 5 of the slab 1. Consequently, if this distance is detected by a detector 13 operatively associated with the feed screw 11 in terms of the number of turns of the feed screw 11 and if the width is indicated in digital form through a known type of computing circuit, the actual measurement of the width of the slab 1 may be measured.

In the embodiment described above, the superhigh pressure mercury vapor lamp used as the light source of the projector 9 has a spectral distribution as shown in FIG. 6 and its radiation intensity is high at the wavelengths ranging from 4,300 to 4,400 A as shown by the peak portion indicated by the arrow in FIG. 6. Xenon lamps which are now in wide use have the maximum radiation intensity at a wavelength higher than 8,000 A and therefore they are not suitable for use with the present invention.

Figure 7:
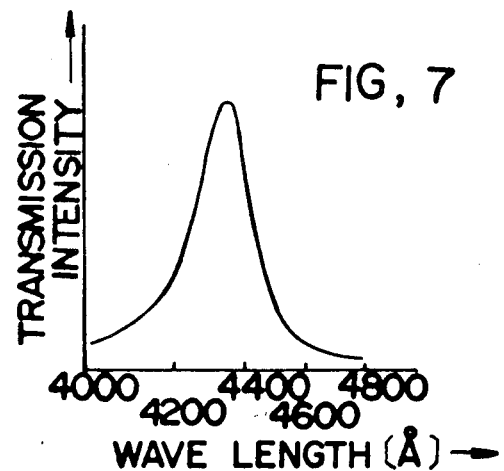
FIG. 7 is a transmission characteristic diagram of the band-pass filter used in the apparatus of this invention.

While the band-pass filter receives both the reflected light of the light projected from the light source, i.e., the optical mark, and the thermal radiation of the slab 1, it is essential that it has a bass-pass characteristic so that of these incident lights only those which lie in the wavelength band indicated by the arrow in FIG. 6 are transmitted therethrough. Thus, it may for example be a metal interference filter having the transmission characteristic shown in FIG. 7, that is, one which has the maximum transmittance at near 4,358 A.

The camera tube comprises a vidicon which has a sensitivity in the wavelength band selected by the band-pass filter, i.e., the wavelength band from 4,300 to 4,400 A. Thus, it may for example be a vidicon having the sensitivity characteristic shown in FIG. 8, i.e., one which has the maximum sensitivity at 4,350 A. However, it is of course needless to say that any other camera tube having the similar sensitivity characteristic, e.g., a low velocity beam scanning tube such as an orthicon or image orthicon or a high velocity beam scanning tube such as an iconoscope or image iconoscope may also be employed.

In FIG. 5, there is illustrated another embodiment of the apparatus according to this invention for performing the novel gauge measuring method of this invention wherein the conveyor 3 is not provided with the guide wall 2 used in the apparatus of FIG. 4, and the position of the slab 1 conveyed over the conveyor 3 is not fixed, i.e., it is moved into a given position and measured thereat. In this embodiment, two measuring systems which are similar to that used in the embodiment of FIG. 4 are arranged on both sides of the conveyors 3 at positions each of which is apart from the conveyor 3 by a known distance, e.g., an equal distance, and the same given line on the conveyor line, i.e., the center line C-C' in this case, is utilized as a base line to establish thereon a reference projection point for each of the measuring systems. In this case, the establishment of these reference projection points are performed in the following manner. A projection screen is preliminarily put on the center line C-C' of the conveyor 3, and then the optical marks projected on the screen by light projectors 22 and 26 are respectively picked up by television cameras 24 and 43 to establish a sampling mark on each of the respective monitor screens in the similar manner as in the case of FIG. 4.

In operation, when the slab 1 is not present between the measuring systems, only the sampling mark is present on each television monitor screen and there is no optical mark. Then, as the slab 1 is advanced to a position between the measuring systems, the images of the optical marks projected by the projectors 22 and 36 on the surface of the slab 1 are displayed on the respective monitor screens so that the optical mark appears on each monitor screen at a position apart from the sampling mark in the similar manner as described in connection with the embodiment of FIG. 4.

Where the center line S-S' of the slab 1 advanced and intervening between the measuring systems does not coincide with the center line C-C' of the conveyor line, a projection line 39 of the projector 22 mounted on a movable rest 23 intersects the center line C-C' of the conveyor line and a television camera pickup extension line 41 meets at right angles with the center line C-C' of the conveyor line. Consequently, as was the case with the embodiment of FIG. 4, when the slab is advanced to the front of the measuring system, the movable rest 23 is moved to a position 26 indicated by a dotted line and hence the position of the projector 22 is also moved to the position of a dotted line 42 simultaneously moving the projection line 39 to the position of a projection line 40. In this case, an intersection point 28 of the pickup line 41 from the television camera 24 and the projection line 40 represents the side face of the slab 1. Therefore, as in the case of FIG. 4, the width dimension 29 from the center line C-C' of the conveyor line to the slab side is equal to a distance 38 travelled by the movable rest 23. The similar process of operations takes place with the measuring system on the opposite side of the conveyor 3. In other words, the projection line and the pickup line of the projector 36 and the television camera 43 carried on a movable rest 35 mounted on a measuring system stand 33 are relatively directed to an intersection point 31 with the center line C-C' of the conveyor line as in the case of the first measuring system. Consequently, the dimension of a slab width 30 from a measuring point 32 of the slab 1 to the center line C–C' of the conveyor line is equal to a distance 37 travelled by the movable rest 35. Accordingly, the sum of the distances 38 and 37 covered by the two measuring systems represents the actual value of the slab width.

It will thus be seen from the foregoing description that in the measurement of a gauge of a high temperature material by a non-contact process in accordance with this invention, an optical mark detected by a television camera is sufficiently distinct even in the presence of the thermal radiation of the high temperature lying in the visible region, and moreover accurate measurement of dimensions which is almost free from mistakes and errors is ensured, since the detecting means is moved in such a manner that the optical mark and the sampling mark on the monitor screen coincide with each other and the dimension of the material is measured in accordance with the distance travelled by the detecting means.

We claim:

1. A method for non-contact measurement of a gauge of a high temperature material comprising:
   a. directing at least one camera tube having a sensitivity to a beam of light of a given wavelength band in the near-ultraviolet zone in a direction such that the optical axis of the camera tube extends in the direction of a gauge of a high temperature material to be measured;
   b. arranging at least one band-pass filter having said wavelength band as its transmission band in front of said camera tube along the directional axis of said camera tube;
   c. projecting said beam of light in said wavelength band to a reference projection point along said directional axis with the high temperature material being absent from said beam of light;
   d. establishing a sampling mark corresponding to an optical mark formed by said beam of light at said reference projection point on the screen of at least one television monitor which displays the output of said camera tube;
   e. displaying an optical mark projected by said projection of light on said high temperature material to be measured on said television monitor screen;
   f. moving said light source and said camera tube in a direction parallel to said direction of the gauge to be measured by maintaining the light projecting and receiving axes relationships established in said reference projection conditions and in such a manner that said optical mark and said sampling mark on said television monitor screen coincide with each other; and
   g. detecting the gauge of said high temperature material from said reference projection point in accordance with the distance covered by said movement of said light source and said camera tube.

2. A method according to claim 1, wherein said wavelength band extends from 4,300 to 4,400 A.

3. A method according to claim 1, wherein said reference projection point is established on one side edge of said high temperature material along said direction of the gauge to be measured, and said projection and picking up of the light are effected on the other side edge of said high temperature material.

4. A method according to claim 1, wherein said reference projection points are established along one line on a transfer line for said high temperature material to be measured, said projection and picking up of the light are effected by the light source and camera tube at each of two positions which are located on both sides of said transfer line and spaced away therefrom by a known distance, and the gauge of said high temperature material is detected in accordance with the sum of the distances covered by the movement of the light source and camera tube arranged on each side of said transfer line.

5. A method according to claim 1, wherein said reference projection points are established along the center line of the transfer line for the high temperature material to be measured, and said projection and picking up of the light is effected from each of two positions located on both sides of said transfer line and spaced away by an equal distance from said center line.

6. An apparatus for non-contact measurement of a gauge of a high temperature material comprising at least one measuring system, said measuring system comprising:
   a. A camera tube directed so that its optical axis extends in the direction of a gauge of a high temperature material to be measured and having a sensitivity to a beam of light of a given wavelength band in the nearultraviolet zone;
   b. A band-pass filter disposed in front of said camera tube along the directional axis thereof and having said wavelength band as its transmission band;
   c. A light source directed along a projection axis intersecting said optical axis and projecting a beam of light of said wavelength band to the intersection of said optical axis and said projection axis for constituting a reference projection point;
   d. A television monitor having a screen on which is established a sampling mark corresponding to an optical mark formed by said beam of light projected onto said reference projection point;
   e. driving means for moving said light source and said camera tube in a direction parallel to said gauge to be measured without changing the relationship between said projection and receiving axes established in said reference projection conditions and until an optical mark projected by said light source on said high temperature material to be measured coincides with said sampling mark on said television monitor screen; and
   f. means for detecting the gauge of said high temperature material from said reference projection point in accordance with the distance covered by said movement of said light source and said camera tube.

7. An apparatus according to claim 6, wherein said measuring system is arranged on one side of a transfer line for the high temperature material, and further comprising a guide wall mounted on the other side edge portion of said transfer line to face said measuring system and include said reference projection point in the surface thereof on the transfer line side, and means whereby said high temperature material in conveyance on said transfer line is pressed and stopped against said guide wall in the front of said measuring system.

8. An apparatus according to claim 6, wherein said measuring system is arranged on each side of said transfer line for said high temperature material at a position spaced away therefrom by a predetermined distance, the optical axes of said light source and said camera tube in each of said measuring systems being selected in such a manner that said reference projection point for each said measuring system is located along the same line parallel to the axis of said transfer line within the width thereof, and further comprising means for detecting the gauge of said high temperature material in accordance with the sum of the distances covered by said parallel motion of said light source and camera tube in each said measuring system.

9. An apparatus according to claim 8, wherein said measuring systems arranged on both sides of said transfer line for the high temperature material are spaced away from said transfer line by an equal distance, and the optical axes of said light source and camera tube in each said measuring system are selected so that said reference projection point for each said measuring system is located along the same line parallel to the center line of said transfer line and arranged above said center line in the vertical direction thereof.

10. An apparatus according to claim 6, wherein said light source comprises a superhigh pressure mercury vapor lamp having a high radiation characteristic in the wavelength band from 4,300 to 4,400 A.

11. An apparatus according to claim 6, wherein said band-pass filter comprises a metal interference filter having the maximum transmission sensitivity in the wavelength band from 4,300 to 4,400 A.

12. An apparatus according to claim 6, wherein said camera tube comprises a vidicon having a sensitivity in the wavelength band from 4,300 to 4,400 A.

13. An apparatus according to claim 6, wherein said measuring system further comprises a movable rest for carrying said light source and said camera tube with a predetermined distance therebetween, a measuring system stand on which said movable rest is mounted to reciprocate in predetermined directions, a feed screw for reciprocating said movable rest on said measuring system stand, driving means for driving said feed screw, and stopping means for stopping the operation of said driving means in accordance with the coincidence of said sampling mark and said optical mark on said monitor screen.

14. An apparatus according to claim 13 further comprising gauge indicating means for indicating said distance covered by the parallel motion in digital form in accordance with the number of turns of said feed screw.

* * * * *